Patented May 17, 1938

2,117,623

UNITED STATES PATENT OFFICE 2,117,623

VAT-DYESTUFF PREPARATIONS FOR PRINTING TEXTILES

Max Paquin and Oskar Braun, Frankfort-on-the-Main, Germany, assignors to General Aniline Works, Inc., New York, N. Y., a corporation of Delaware No Drawing. Application May 4, 1937, Serial No. 140,730. In Germany May 12, 1936

5 Claims. (Cl. 8—6)

The present invention relates to vat-dyestuff preparations for printing textiles.

The processes hitherto usually applied for printing with vat-dyestuffs, especially with those of the anthraquinone series, in many cases, do not yield optimum effects on the fabrics. The tinctorial strength and the evenness are often not at all satisfactory. These deficiencies are especially great in the case of textile materials made from artificial silk fibers.

We have found a process by which very deep and even prints are obtained on the fiber, especially also on artificial silk, when using vat-dyestuffs of the anthraquinone series, by adding to the dyestuff pastes condensation products from urea or a derivative thereof and the reaction products of alkylene oxides with organic compounds containing more than one amino-group. This addition increases the speed of fixation and improves the certainty of the operation when the steam conditions vary. As derivatives of urea there may, for instance, be named: the ureas substituted at the nitrogen atom by alkyl-radicals, as methyl urea, ethyl urea; furthermore, thiourea and imino-urea and the alkyl-substitution products thereof. By organic compounds containing more than one amino-group there are, for instance, meant compounds of urea, thiourea, guanidine, ethylenediamine, diamino-benzene.

The condensation products to be added to the dyestuff paste are obtained from urea and the reaction product of the di- or polyaminocompound with alkylene oxide, for instance, by heating urea with the reaction product at a temperature between 70° C. and 200° C. A process of preparing them is, for instance, described in U. S. patent application Serial No. 31,734, filed July 16, 1935, in the name of Max Paquin for "Condensation products and a process of preparing them", and may be carried out, for instance, by condensing 1 molecular proportion of the di- or polyaminocompound with 1 molecular proportion of alkylene-oxide, for instance, ethylene oxide or propylene oxide, and heating then 1 molecular proportion of the condensation product thus obtained with 1 molecular proportion of urea or alkyl-urea or thiourea or guanidine. The condensation products are easily soluble, viscous or semi-solid products which easily dissolve in the dyestuff paste and permit printing with the usual thickening agents and the other usual additions.

The following examples serve to illustrate the invention, but they are not intended to limit it thereto; the parts are by weight:—

(1) 20 parts of the dyestuff No. 1228 (Schultz Farbstofftabellen, 7th edition) are made up to a dyestuff paste of 20 per cent. strength by addition of suitable protective colloids (such as dextrin) and water. 80 parts of the dyestuff paste thus obtained are well stirred with an equal weight of a condensation product from monooxyethylethylenediamine and urea and, after being allowed to stand for some time, the mixture is introduced while stirring into a printing thickening consisting of

| | Parts |
|---|---|
| Wheat starch tragacanth thickening | 350 |
| Glycerine | 80 |
| Potassium carbonate | 120 |
| Formaldehyde sodium sulphoxylate | 80 |
| Water | 210 |

A printing color prepared in this way yields on the various kinds of artificial silk essentially fuller, more even and more vivid prints in a shorter time of fixation than can be obtained with the same color without addition of the urea condensation product without the said addition.

(2) 80 parts of the dyestuff No. 1237 of Schultz Farbstofftabellen, 7th edition, of 20 per cent strength are well mixed with 40 parts of a condensation product from oxypropylethylenediamine and urea and worked up into a printing color as described in Example 1.

On cotton and artificial silk as well as on mixed fabrics of cotton and artificial silk more intense prints of greater purity are obtained than without the addition of the urea condensation product.

(3) 80 parts of the dyestuff No. 1234 (Schultz Farbstofftabellen, 7th edition) of 20 per cent strength are intimately mixed with 80 parts of the condensation product from 1 molecular proportion of urea and 1 molecular proportion of the reaction product from 1 molecular proportion of urea with 1 molecular proportion of ethylene oxide and worked up into a printing color as described in Example 1. On artificial silk more intense prints of greater purity are obtained than without addition of the urea condensation products.

(4) 80 parts of the dyestuff No. 1237 (Schultz Farbstofftabellen, 7th edition) of 20 per cent strength are well mixed with 60 parts of the condensation product from 1 molecular proportion of urea and 1 molecular proportion of the reaction product from 1 molecular proportion of polyethylenediamine with 1 molecular proportion of propylene-oxide and worked up into a printing color as described in Example 1. On cotton and artificial silk as well as on mixed fabrics of cotton and artificial silk prints are obtained, which are especially intense and pure.

(5) 20 parts of the dyestuff No. 1228 (Schultz Farbstofftabellen, 7th edition) of 20 per cent strength are well mixed with 70 parts of a condensation product from 1 molecular proportion of methylurea and 1 molecular proportion of the reaction product from 1 molecular proportion of urea with 1 molecular proportion of ethylene oxide and worked up into a printing color as described in Example 1. On artificial silk very full and intense prints are obtained.

(6) 80 parts of the dyestuff No. 1234 (Schultz Farbstofftabellen, 7th edition) of 20 per cent strength are well stirred with 80 parts of a condensation product from 1 molecular proportion of guanidine and 1 molecular proportion of a reaction product from 1 molecular proportion of urea with 1 molecular proportion of propylene oxide and worked up into a printing color as described in Example 1. On artificial silk and cotton very full, even and intense prints are obtained, which are very quickly fixed.

(7) 80 parts of the dyestuff No. 1237 (Schultz Farbstofftabellen, 7th edition) of 20 per cent strength are intimately mixed with 60 parts of the condensation product from 1 molecular proportion of urea and 1 molecular proportion of the reaction product from 1 molecular proportion of guandine with 1 molecular proportion of ethylene oxide and worked up into a printing color as described in Example 1. On artificial silk very intense prints are obtained.

(8) 20 parts of the dyestuff No. 1228 (Schultz Farbstofftabellen, 7th edition) of 20 per cent strength are well mixed with 80 parts of the condensation product from 1 molecular proportion of urea and 1 molecular proportion of a reaction product from 1 molecular proportion of 1.4-diaminobenzene with 1¼ molecular proportions of ethylene oxide and worked up into a printing color as described in Example 1. On artificial silk and cotton full pure and very intense prints are obtained.

We claim:

1. Dyestuff preparations containing a vat-dyestuff of the anthraquinone series and a condensation product obtained by heating a compound of the general formula

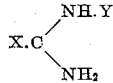

wherein X stands for a member of the group consisting of O, S, NH, Y stands for a member of the group consisting of H and aliphatic hydrocarbon radicals, together with a compound of the general formula $$R_1.NH.R.OH$$

wherein R stands for an alkylene radical, $R_1$ stands for an organic radical substituted by at least one $NH_2$ group.

2. Dyestuff preparations containing a vat-dyestuff of the anthraquinone series and a condensation product obtained by heating one mol. of a compound of the general formula

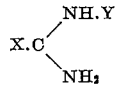

wherein X stands for a member of the group consisting of O, S, NH, Y stands for a member of the group consisting of H and aliphatic hydrocarbon radicals, together with one mol. of a compound of the general formula $$R_1.NH.R.OH$$

wherein R stands for an alkylene radical, $R_1$ stands for an organic radical substituted by at least one $NH_2$ group.

3. Dyestuff preparations containing a vat-dyestuff of the anthraquinone series and a condensation product obtained by heating one mol. of a compound of the general formula

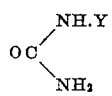

wherein Y stands for a member of the group consisting of H and aliphatic hydrocarbon radicals, together with one mol. of a compound of the general formula $$R_1.NH.R.OH$$

wherein R stands for an alkylene radical, $R_1$ stands for an aliphatic radical substituted by $NH_2$.

4. Dyestuff preparations containing a vat-dyestuff of the anthraquinone series and a condensation product obtained by heating one mol. of urea together with one mol. of the compound of the formula

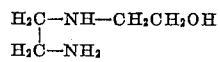

5. Dyestuff preparations containing a vat-dyestuff of the anthraquinone series and a condensation product obtained by heating one mol. of urea together with one mol. of the compound of the formula

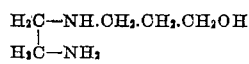

MAX PAQUIN.
OSKAR BRAUN.